United States Patent [19]
Chan et al.

[11] Patent Number: 6,130,199
[45] Date of Patent: Oct. 10, 2000

[54] SURFACTANT COMPOSITION FOR CLEANING WELLBORE AND OIL FIELD SURFACES USING THE SURFACTANT COMPOSITION

[75] Inventors: Albert F. Chan, Plano, Tex.; William Mark Bohon; David J. Blumer, both of Anchorage, Ak.; Kieu T. Ly, Richardson, Tex.

[73] Assignee: Atlantic Richfield Company, Chicago, Ill.

[21] Appl. No.: 09/372,883

[22] Filed: Aug. 12, 1999

Related U.S. Application Data

[62] Division of application No. 09/023,909, Feb. 13, 1998, Pat. No. 5,996,692.

[51] Int. Cl.[7] ..................................................... C11D 9/26
[52] U.S. Cl. .......................... 510/535; 510/470; 510/505
[58] Field of Search .................................. 510/188, 470, 510/505, 535, 537

[56] References Cited

U.S. PATENT DOCUMENTS

| | | | |
|---|---|---|---|
| 3,070,162 | 12/1962 | Barnard, Jr. .............................. | 166/38 |
| 3,529,666 | 9/1970 | Crowe ..................................... | 166/300 |
| 3,653,441 | 4/1972 | Tuttle ..................................... | 166/291 |
| 3,756,319 | 9/1973 | Holm et al. .............................. | 166/304 |
| 3,884,302 | 5/1975 | Messenger ............................... | 166/291 |
| 4,083,407 | 4/1978 | Griffin, Jr. et al. ..................... | 166/291 |
| 4,176,720 | 12/1979 | Wilson .................................... | 166/293 |
| 4,216,022 | 8/1980 | Wilson .................................... | 106/104 |
| 4,217,229 | 8/1980 | Watson .................................. | 252/8.55 R |
| 4,276,182 | 6/1981 | Beirute .................................. | 252/8.55 R |
| 4,322,301 | 3/1982 | Blackmore ............................ | 252/8.5 A |
| 4,342,866 | 8/1982 | Kang et al. ............................. | 536/119 |
| 4,374,738 | 2/1983 | Kelley ................................... | 252/8.5 C |
| 4,423,781 | 1/1984 | Thomas .................................. | 166/312 |
| 4,528,106 | 7/1985 | Grolitzer ............................. | 252/8.55 D |
| 4,565,647 | 1/1986 | Llenado ................................. | 252/354 |
| 4,648,453 | 3/1987 | Nagra et al. ............................ | 166/281 |
| 4,681,164 | 7/1987 | Stacks ..................................... | 166/304 |
| 4,717,488 | 1/1988 | Seheult et al. ........................ | 252/8.551 |
| 4,856,589 | 8/1989 | Kuhlman et al. ....................... | 507/211 |
| 4,883,125 | 11/1989 | Wilson et al. .......................... | 166/291 |
| 5,723,426 | 3/1998 | Zhen et al. ............................. | 510/337 |
| 5,789,352 | 8/1998 | Carpenter et al. ..................... | 507/209 |
| 5,814,591 | 9/1998 | Mills et al. ............................. | 510/238 |
| 5,888,955 | 3/1999 | Foley et al. ............................ | 510/235 |
| 5,948,742 | 9/1999 | Chang et al. .......................... | 510/191 |
| 5,977,032 | 11/1999 | Chan ...................................... | 507/211 |
| 5,996,692 | 12/1999 | Chan et al. ............................ | 166/263 |
| 6,000,412 | 12/1999 | Chan et al. ............................ | 134/22.14 |

*Primary Examiner*—William Krynski
*Assistant Examiner*—Dawn L. Garrett
*Attorney, Agent, or Firm*—F. Lindsey Scott; Robert E. Sloat

[57] ABSTRACT

A method and composition for removing deposits of heavy hydrocarbonaceous materials and finely divided inorganic particulate matter from wellbore and flowline surfaces using a composition containing an alkyl polyglycoside, an ethoxylated alcohol, a caustic and an alkyl alcohol.

16 Claims, 4 Drawing Sheets

2(a)   2(b)   2(c)   2(d)

ber
SURFACTANT COMPOSITION FOR CLEANING WELLBORE AND OIL FIELD SURFACES USING THE SURFACTANT COMPOSITION This is a division, of application Ser. No. 09/023,909 filed on Feb. 13, 1998, now U.S. Pat. No. 5,996,692.

BACKGROUND OF THE INVENTION

1. Field of the Invention

This invention relates to the removal of deposits comprising heavy hydrocarbonaceous materials and finely divided inorganic solids from wellbore surfaces and from other surfaces, such as the inside of piping such as tubing or casing and flowlines, using an alkyl polyglycoside surfactant composition.

2. Background of the Invention

Mixtures of oil, gas and water are frequently produced from oil fields. Processes for treating such mixtures to produce separate streams of oil, gas and water are well known. Typically the oil is separated and recovered as a product; the gas may be separated and recovered as a product; or, alternatively, the gas may be injected into a gas cap above an oil-bearing zone, into an oil-bearing zone or the like as recovered or as a miscible injectant which comprises the produced gas adjusted by the addition of nitrogen, carbon dioxide, hydrocarbons containing from one to about five carbon atoms and the like to adjust the specific gravity of the gas to produce a miscible injectant. The water may be recovered for injection or disposal by other means as known to those skilled in the art.

The separation is frequently accomplished in large settling tanks where the oil, gas and water are allowed to gravimetrically separate.

In many instances, the mixture of oil, gas and water is passed to central processing facilities for separation with the oil being recovered as a product and with the gas being either wholly or partially recovered as a product also. In some instances, the gas is distributed to injection wells and injected; and, in some fields, the water is similarly recovered, passed to injection wells and injected into the formation for the disposal of the water, for secondary oil recovery and the like.

It has been found, when such operations are conducted, especially when corrosion inhibitors are used in the lines leading from the wells to the central processing facility and the like, that, over a period of time, deposits of heavy hydrocarbonaceous materials and finely divided inorganic solids deposit on the inner surfaces of the lines. These deposits typically comprise finely-divided inorganic particles such as produced solids which may include hydraulic fracturing proppant, formation sand, formation fines and precipitates of materials such as iron sulfide. These particles become coated with corrosion inhibitor or other hydrocarbonaceous materials and subsequently accumulate additional quantities of heavy hydro-carbonaceous material in the flowlines, settling tank and the like. These deposits are referred to herein as "schmoo". The schmoo is a slimy, oily substance which adheres to almost any surface with which it comes in contact, and is difficultly removed from any surface and particularly from the inner surfaces of flowlines, water injection lines into the formation, wellbore surfaces and the like. The material is removable by pigging from flowlines which are of a sufficient size and configuration that pigs can be run through the lines. Such lines are routinely cleaned by pigging. Other lines, such as injection lines into wells, small diameter flowlines, the settling tank surfaces and formation surfaces are not accessible by pigging operations and, accordingly, the schmoo accumulates on the inner surfaces of these pipe lines, on the surfaces of the well and the like. The schmoo is detrimental to continued operations for a number of reasons. It has been found that it shelters bacteria which generate corrosive sulfides and other compounds beneath the schmoo and in contact with the pipe. This results in accelerated corrosion of the pipe surfaces, the formation of pits and eventual failure of the pipe. The replacement of pipe is expensive. The material can also accumulate to a thickness such that it flakes off the inner surfaces of the pipe and deposits in the lower portion of a well, the lower portion of a line or the like, and plugs the line or the formation in fluid communication with the pipe. This can result in the necessity for cleaning operations such as the use of coiled tubing with the injection of organic solvents such as mixtures of diesel oil and xylene, to clean such deposits from wellbores. Such deposits in wellbores are particularly common in wells which are used for alternating water and gas injection. In such wells, the schmoo dries on the inner surfaces of the tubing during gas injection and subsequently cracks and falls into the wellbore, thereby eventually plugging the wellbore, sometimes to a considerable depth. The removal of such deposits with coiled tubing units is expensive, time-consuming and does nothing to remove deposits from the surrounding formation.

In view of the difficulties created by the deposit of such materials, a continuing search has been directed to the development of a method for the removal of such deposits without the necessity for a pigging or coiled tubing operation for the removal of the deposits.

SUMMARY OF THE INVENTION

According to the present invention, it has been found that such deposits can be removed by the use of a surfactant composition consisting essentially of an aqueous solution containing from about 0.1 to about 10.0 weight percent of an alkyl polyglycoside surfactant selected from alkyl polyglycosides containing alkyl groups containing from about 8 to about 19 carbon atoms and mixtures thereof; from about 0.1 to about 10.0 weight percent of an ethoxylated alcohol selected from the group consisting of ethoxylated alkyl alcohols containing from about 6 to about 16 carbon atoms in the alkyl alcohol and from about 2 to about 6 ethylene oxide groups and mixtures thereof, and ethoxylated alkyl phenols containing from about 8 to about 14 carbon atoms in the alkyl group and from about 2 to about 8 ethylene oxide groups and mixtures thereof, and mixtures of the ethoxylated alkyl alcohols and the ethoxylated alkyl phenols; from about 0.5 to about 10.0 weight percent of a caustic selected from the group consisting of sodium hydroxide, potassium hydroxide, ammonium hydroxide and mixtures thereof; and, from about 0.1 to about 6.0 weight percent of at least one alkyl alcohol containing from about 4 to about 6 carbon atoms. The alkyl polyglycoside surfactant has a DP number from about 1.3 to about 1.8.

The surfactant composition can be produced from an aqueous surfactant composition concentrate by dilution with an aqueous solution such as water, brine or the like to provide the surfactant composition. The aqueous surfactant composition concentrate comprises an aqueous solution containing from about 4.0 to about 20.0 weight percent of an alkyl polyglycoside surfactant selected from alkyl polyglycosides containing alkyl groups containing from about 8 to about 19 carbon atoms and mixtures thereof; from about 1.0 to about 15.0 weight percent of an ethoxylated alcohol selected from the group consisting of ethoxylated alkyl alcohols containing from about 6 to about 16 carbon atoms in the alkyl alcohol and from about 2 to about 6 ethylene oxide groups and mixtures thereof and ethoxylated alkyl phenols containing from about 8 to about 14 carbon atoms in the alkyl group and from about 2 to about 8 ethylene oxide groups and mixtures thereof and mixtures of the ethoxylated alkyl alcohols and the ethoxylated alkyl phenols; from about 4.0 to about 30.0 weight percent of a caustic selected from the group consisting of sodium hydroxide, potassium hydroxide, ammonium hydroxide and mixtures thereof; and from about 0.5 to about 10.0 weight percent of at least one alkyl alcohol containing from about 4 to about 6 carbon atoms.

The present invention further comprises a method for removing deposits comprising heavy hydrocarbonaceous materials and finely divided inorganic particulate materials from a tubing in a water injection well by injecting the aqueous surfactant composition into the tubing, retaining the aqueous surfactant composition in the tubing for a selected time period, and thereafter injecting an aqueous solution through the tubing.

The present invention further comprises a method for removing heavy deposits comprising heavy hydrocarbonaceous materials and finely divided inorganic particulate solids from a tubing in an alternating water and gas injection well by injecting the aqueous surfactant composition into the tubing in an amount sufficient to substantially fill the tubing, and retaining the aqueous surfactant composition in the tubing for a selected time period.

The present invention further includes a method for unplugging wells which have been plugged with deposits comprising heavy hydrocarbonaceous materials and finely divided inorganic materials by injecting the aqueous surfactant composition into the well, retaining the aqueous surfactant composition in the well for a selected period of time to dissolve at least a portion of the deposits, and injecting an aqueous solution through the well and into a subterranean formation in fluid communication with the well.

The present invention also comprises a method for removing deposits comprising heavy hydrocarbonaceous materials and finely divided inorganic material from a flowline by injecting the aqueous surfactant composition into the flowline in an amount sufficient to substantially fill the flowline; retaining the aqueous surfactant composition in the flowline for a selected time period, and thereafter flowing an aqueous solution through the flowline to remove the aqueous surfactant composition and dissolve deposits.

DESCRIPTION OF PREFERRED EMBODIMENTS

Figure 1:
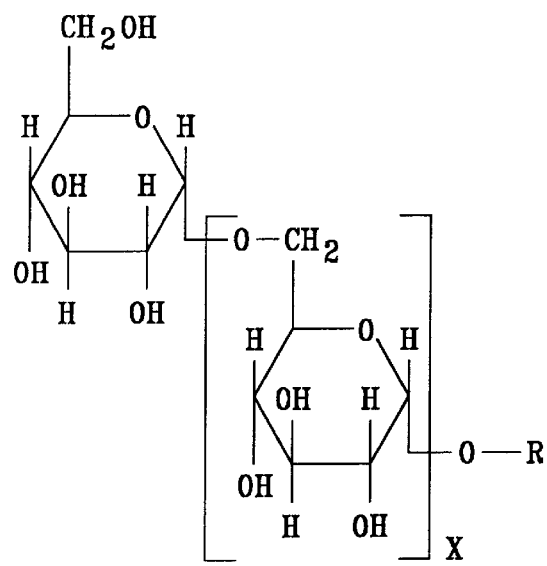
FIG. 1 is a diagram of the molecular structure of an alkyl polyglycoside.

In the discussion of the figures, various pumps, valves and the like necessary to achieve the flows described have not been shown in the interest of conciseness. All concentrations are by weight percent of active ingredient in the aqueous solution unless otherwise stated.

The surfactant composition of the present invention consists essentially of an aqueous solution containing from about 0.1 to about 10.0 weight percent, and preferably from about 0.2 to about 4.0 weight percent, of an alkyl polyglycoside surfactant selected from alkyl polyglycosides containing alkyl groups containing from about 8 to about 19 carbon atoms and mixtures thereof; from about 0.1 to about 10.0 weight percent of an ethoxylated alcohol selected from the group consisting of ethoxylated alkyl alcohols containing from about 6 to about 16 carbon atoms in the alkyl alcohol and from about 2 to about 6 ethylene oxide groups and mixtures thereof, and ethoxylated alkyl phenols containing from about 8 to about 14 carbon atoms in the alkyl group and from about 2 to about 8 ethylene oxide groups and mixtures thereof, and mixtures of the ethoxylated alkyl phenols and the ethoxylated alkyl alcohols; from about 0.5 to about 10.0 weight percent of a caustic selected from the group consisting of sodium hydroxide, potassium hydroxide, ammonium hydroxide and mixtures thereof; and, from about 0.1 to about 6.0 weight percent of at least one alkyl alcohol containing from about 4 to about 6 carbon atoms. Preferably, the alkyl polyglycoside, ethoxylated alcohol, and alkyl alcohol comprise from about 0.5 to about 6.0 weight percent of the aqueous solution. Desirably, the alkyl polyglycoside surfactant has a DP number from about 1.30 to about 1.80. The DP number is a measure of the degree of polymerization of the alkyl polyglycoside as defined in Alkyl *Polyglycosides; Technology, Properties and Applications*, edited by Karlheinz Hill, Wolfgang Von Rybinski and Gerhard Stoll, VCH Verlagegesellschaft Mbh, Weinhein (Federal Republic of Germany) and VCH Publishers Inc., New York, New York 1997, pp 11–12.

The alkyl polyglycoside surfactant may comprise a first surfactant consisting essentially of an alkyl polyglycoside selected from the group consisting of alkyl polyglycosides containing alkyl groups containing an odd number of carbon atoms from about 9 to about 13 carbon atoms and mixtures thereof, and having an oligomer distribution from 1 to 12, and a second surfactant consisting essentially of alkyl polyglycosides selected from the group consisting of alkyl polyglycosides containing alkyl groups, a major portion of which are even numbered allyl groups which contain from about 12 to about 18 carbon atoms and having an oligomer distribution from 1 to 12. Desirably, the alkyl polyglycoside surfactant contains from about 20 to about 90 mole percent of the first surfactant.

The second surfactant may also contain alkyl polyglycosides containing alkyl groups containing odd numbers of carbon atoms from about 9 to about 19 carbon atoms. Either odd-numbered or even-numbered alkyl groups may be used in either the first or the second surfactant as desired to optimize the surfactant properties.

The even numbered alkyl groups are representative of naturally occurring alkyl groups and tend to have a higher pour point and are less convenient to use as surfactants in wellbore operations and the like. Such surfactants are much more viscous and tend to gel at lower temperatures and are otherwise more difficult to handle than the corresponding alkyl polyglycosides containing alkyl groups containing an odd number of carbon atoms. The alkyl groups containing odd numbers of carbon atoms are representative of refinery product streams and are not naturally occurring.

Preferably, the ethoxylated alcohol is present in an amount equal to from about 0.2 to about 4.0 weight percent. The ethoxylated alkyl alcohol may be selected from ethoxylated linear alkyl alcohols, branched alkyl alcohols, Guerbet alcohols, mixtures thereof, and the like. The ethoxylated alkyl phenols may contain linear, branched, Guerbet or a mixture of linear, branched and Guerbet alkyl groups. It is preferred that the ethoxylated alcohol be selected from ethoxylated alkyl alcohols containing from about 6 to about 16 carbon atoms in the alkyl alcohol and from about 2 to about 6 ethylene oxide groups.

The caustic material is desirably present in an amount equal to from about 1.0 to about 5.0 weight percent of the aqueous solution. The caustic is a necessary component of the surfactant composition since it is required in combination with the alkyl polyglycosides and the ethoxylated alcohol to effectively dissolve and remove the deposits.

It is also preferred that the alkyl alcohol be present in an amount equal to from about 0.2 to about 3.0 weight percent. The alkyl alcohol may be a linear or branched alkyl alcohol. The alcohol facilitates mixing and aqueous surfactant composition stability. In the absence of the alcohol, an alkyl polyglycoside surfactant layer and a caustic layer may form in the surfactant composition. While all of the ingredients are present in each layer, they are present in different proportions. With the alkyl alcohol, a homogenous mixture is readily achieved and maintained.

The surfactant composition comprises primarily water. Accordingly, it is less economical to transport the surfactant composition in this form. It is preferred that the surfactant composition be produced at the location where it is to be used by dilution of an aqueous surfactant concentrate. A concentrate of the aqueous surfactant composition can be produced for dilution with an aqueous solution to produce the surfactant composition. The concentrate composition comprises an aqueous solution containing from about 4.0 to about 20.0 weight percent of an alkyl polyglycoside surfactant selected from alkyl polyglycosides containing alkyl groups containing from about 8 to about 19 carbon atoms and mixtures thereof; from about 1.0 to about 15.0 weight percent of an ethoxylated alcohol selected from the group consisting of ethoxylated alkyl alcohols containing from about 6 to about 16 carbon atoms in the alkyl alcohol and from about 2 to about 6 ethylene oxide groups and mixtures thereof and ethoxylated alkyl phenols containing from about 8 to about 14 carbon atoms in the alkyl group and from about 2 to about 8 ethylene oxide groups and mixtures thereof and mixtures of the ethoxylated alkyl alcohols and the ethoxylated alkyl phenols; from about 4.0 to about 30.0 weight percent of a caustic selected from the group consisting of sodium hydroxide, potassium hydroxide, ammonium hydroxide and mixtures thereof; and from about 0.5 to about 10.0 weight percent of at least one alkyl alcohol containing from about 4 to about 6 carbon atoms. Concentrated compositions containing more of the materials tend to gel and are more difficult to handle and to dilute to produce the surfactant composition. Preferably, the concentrate composition is from about 4.0 to about 12.0 weight percent alkyl polyglycoside surfactant in the aqueous solution; from about 1.0 to about 8.0 weight percent ethoxylated alcohol in the aqueous solution; from about 6.0 to about 22.0 weight percent caustic in the aqueous solution; and from about 1.0 to about 10.0 weight percent alcohol in the aqueous solution. The alkyl polyglycosides and other materials are as described in conjunction with the surfactant composition above.

While the surfactant compositions may be used at substantially any temperature between their freezing points and their boiling points, it is preferred that they be used at temperatures above about 120° F. At lower temperatures, longer contact times may be required to remove the schmoo.

The concentrate may be used at full strength or at any desired dilution.

It is preferred that the concentrate contain a suitable hydrotrope to improve the phase stability of the concentrate and the surfactant composition. The hydrotrope may be a hydrotrope such as monosodium salt of N-lauryl-β-iminodipropionic acid, an alkyl polyglycoside containing linear or branched alkyl groups containing from about 4 to about 8 carbon atoms or the like.

The surfactant composition functions as an alkaline cleaner which solubilizes and disperses the schmoo by suspending it in the surfactant composition in such a fine state that the surfactant composition and suspended schmoo can be injected directly into subterranean formations without damage to the formation. The injection of the surfactant composition into subterranean formations has been observed to increase the injectivity of such formations.

Since the surfactant composition is a foaming surfactant, it is desirable in many applications to add a suitable quantity of an antifoaming compound such as, for example, a silicon-based antifoam compound. Preferably, the antifoaming additive is added at a concentration of about 10 to about 100 ppm to the aqueous solution containing the caustic before addition of the other materials.

Alkyl polyglycoside surfactants consist of a polar glucose head and an organic carbon chain off of the hemiacetal linkage. A representation of the molecule is shown in FIG. 1. There are two ether oxygens and three hydroxyl groups per glucose unit, plus a terminal hydroxyl group. The lipophilic portion of the molecule resides in the alkyl chain R. R can be a linear or branched alkyl group containing from about 8 to about 18 carbon atoms or a Guerbet alkyl containing from about 9 to about 19 carbon atoms. The polymerization reaction can provide oligomer distributions from 1 to 12 (i.e. x=0 to x=11).

Figure 2:
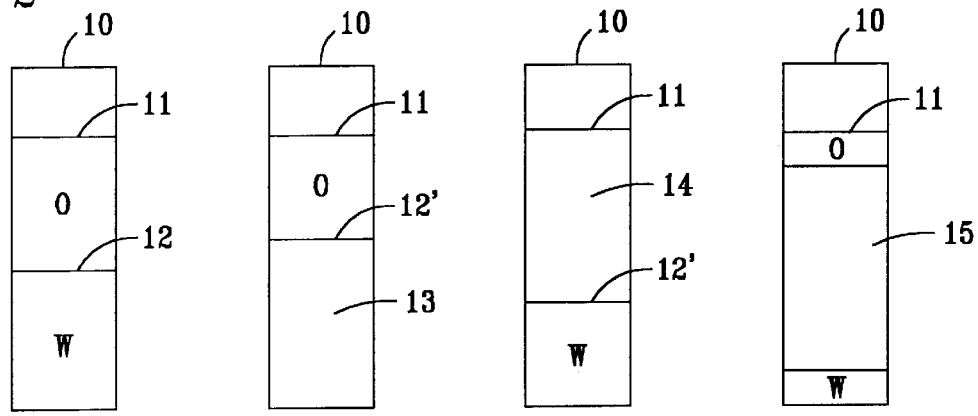
FIG. 2 shows four oil/water systems including Type I, Type II and Type III microemulsions.

In the use of the surfactant composition, it is desirable that the ratio of components be adjusted by testing with the deposits to be removed to form a Type III microemulsion in the wellbore. Such microemulsions are referred to as Windsor Type III or middle phase microemulsions and are described in some detail in "Micellization, Solubilization and Microemulsions", Vol. 2, K. L. Mittal, Plenum Press, New York, 1977. In FIG. 2, Type I, Type II and Type III microemulsions are shown. FIG. 2($a$) shows oil (o) and water (w) containing surfactants in a container 10 to a level 11 and having an interface 12. In FIG. 2($b$), a Type I microemulsion 13, which is an oil-in-water microemulsion, is shown below an excess oil layer (o). Such microemulsions are water soluble and contain quantities of solubilized oil, as shown by the level of the new interface 12' which is above the original interface 12. In FIG. 2($c$), a Type II microemulsion 14, which is a water-in-oil microemulsion, is shown above an excess water layer (w). Such microemulsions are oil soluble and contain quantities of solubilized water as shown by the level of new interface 12' which is below the original interface 12. FIG. 2(d) shows a Type III microemulsion 15, which is located between the excess oil (o) and excess water (w) phases and extends above and below original interface 12. Such Type III microemulsions are preferred for pipe and wellbore cleaning operations since their interfacial tensions and solubilization properties toward both oil and water can greatly facilitate the removal of both from wellbores, pipes or other surfaces. Since it is desirable that the deposits be solubilized and dispersed in the aqueous surfactant, it is desirable that the aqueous surfactant be formulated to produce a Type III microemulsion in the wellbore or pipe. Such microemulsions are much more effective in dissolving hydrocarbonaceous materials in the presence of aqueous solutions than either Type I or Type II microemulsions. It is not necessary that the composition be adjusted to form the desired Type III microemulsion, but it is considered that the surfactant composition is more effective when adjusted to form a Type III microemulsion in the treated area. The microemulsions have better injectivity and propagate through subterranean formations more readily because of their lower interfacial tension and their lower viscosity.

Figure 3:
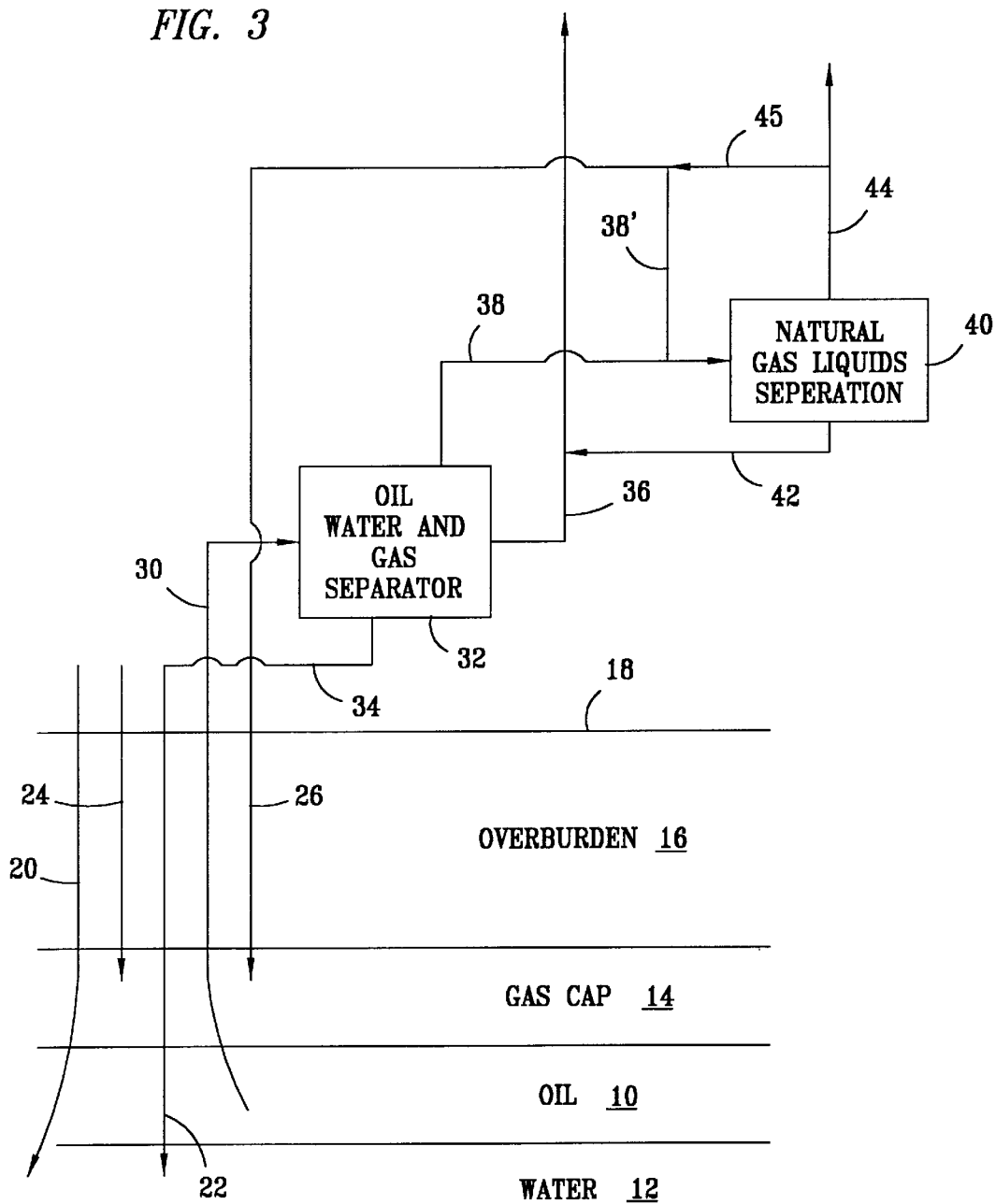
FIG. 3 is a schematic diagram of an oil field operation wherein an oil, gas and water mixture is produced with injection of oil, gas and water.

A typical oil field operation which produces such deposits is shown in FIG. 3. In FIG. 3, an oil-bearing formation 10 is shown positioned above a water-bearing formation 12 and beneath a gas cap 14. Gas cap 14, in turn, is positioned beneath an overburden 16 and beneath a surface 18. Oil, gas and water are produced from oil-bearing formation 10 through a line 30. In the operation of the oil field as shown, sea water may be injected into water-bearing formation 12 as shown by an arrow 20, a miscible gas may be injected into gas cap 14 as shown by arrow 24, and produced water may be injected into water-bearing formation 12 as shown by an arrow 22 with produced gas being optionally introduced into gas cap 14 via a line 26. The produced oil, gas and water stream from oil-bearing formation 10 is passed via a line 30 to an oil, water and gas separator 32. Separator 32 is typically a relatively large vessel to allow a quiescent zone for the gravimetric separation of oil, gas and water. The gas may be recovered, as shown, through a line 38 and passed to a natural gas liquids separation zone 40. In natural gas liquids separation zone 40, natural gas liquids such as butanes, pentanes and the like may be recovered and passed via a line 42 to combination with the crude oil which is separated and recovered from separator 32 via a line 36. The crude oil and natural gas liquids in line 36 are passed to sale or use as a crude oil product. The lighter gases from natural gas liquids separation unit 40 may be passed to use as a natural gas product via a line 44 or, as shown, may be combined, via a line 45, with a portion of the natural gas recovered from separator 32 via a line 38' and passed via line 26 back to injection into the gas cap 14. The produced water is recovered through a line 34 from separator 32 and may be passed with or without further treatment back to water-bearing formation 12 via line 22.

The operations above have been discussed very generally since such operations are considered to be well known to those skilled in the art. Deposits of heavy hydrocarbonaceous materials in combination with finely divided inorganic particulates may occur in lines such as line 30 through which the oil, gas and water mixture is passed to separator 32, in line 34 which is a produced water injection line, or in any other lines wherein water is present, such as the tubing in water injection and water and gas injection wells and in the formations in fluid communication with such wells. The deposits are generally believed to comprise a finely divided inorganic particle which may comprise hydraulic fracturing proppant (approximately 1000 microns), formation sand (approximately 100 microns), formation fines (approximately 10 microns) and precipitates such as iron sulfide (approximately 1 micron). These finely divided inorganic solids form a site which may become coated with a corrosion inhibitor or with heavy hydrocarbonaceous materials. These materials are found in crude oil and in many instances are believed to selectively adhere to the inorganic particulate particles. The net result is that these coated particles, referred to herein as "schmoo", adhere to pipe surfaces, separator surfaces, formation surfaces, equipment surfaces and nearly any other surface with which they come in contact. They can accumulate over relatively short periods of time to plug formations, lines and the like. As discussed previously, they also contribute to accelerated corrosion of flow lines, injection lines and the like. The larger particles are separated in the settling tank. The smaller particles such as coated iron sulfide, finely dispersed oil and the like are primary constituents of the schmoo in pipes and other surfaces downstream from the separation tank. As a result, these materials, when dispersed in the surfactant composition, can be passed into the formation.

Figure 4:
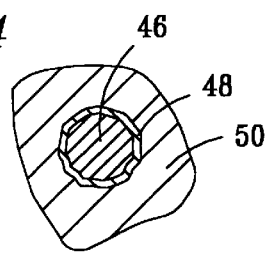
FIG. 4 is a schematic cross-sectional view of a deposit particle containing heavy hydrocarbonaceous materials and a finely divided inorganic particle.

A schematic of a typical particle of schmoo is shown in FIG. 4. The particle comprises an inorganic solid particle nucleus 46 surrounded by a corrosion inhibitor film 48 and by a layer of oil 50. It is believed that, in the oil/water separation step, the oil, which may be heavier hydrocarbonaceous materials, may be selectively retained on the particles with the lighter hydrocarbonaceous materials floating more readily to the surface for recovery as oil. In any event, a sticky, oily mass of this material is typically produced in oil field operations, is readily transported into operating lines, formations and the like, and creates significant operational problems.

Figure 5:
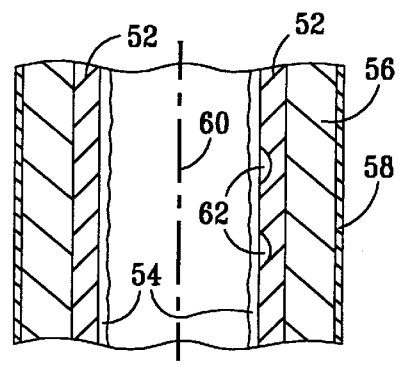
FIG. 5 is a schematic cross-sectional view of a line coated with schmoo on its inner surfaces.

In FIG. 5, a section of a pipe 52 which is encased in insulation 56 and a sheathing 58 is shown. Pipe 52 has a center axis 60 and has become coated on its inner surfaces by a layer of schmoo 54. The schmoo has resulted in the establishment of colonies of bacteria which can generate sulfides and other corrosive materials which are effectively sheltered beneath the layer of schmoo from treatment by conventional biocide materials. Pits 62, as shown, are formed by the bacteria and can lead to early pipe failure. Such pipe failure is typically localized so that the life of the pipe is greatly shortened.

Figure 6:
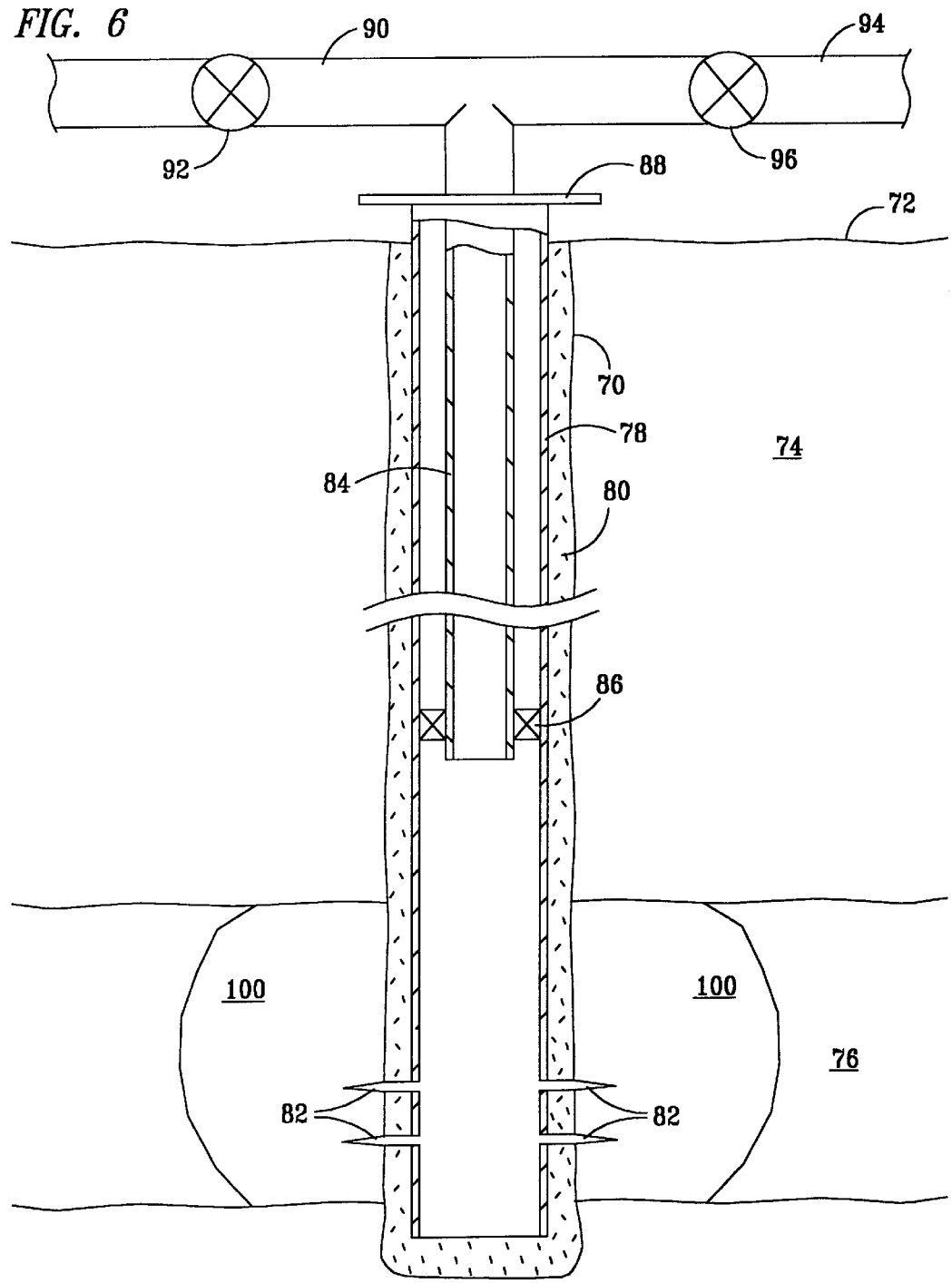
FIG. 6 is a schematic diagram of a water or a water and gas injection well through which water, or alternate slugs of water and gas, are injected into a subterranean formation through a tubing in a casing in the wellbore.

In FIG. 6, an injection well is shown. The injection well comprises a wellbore 70 and includes a casing 78 which is cemented in place in wellbore 70 with cement 80. The well includes a well head 88, which is adapted for the injection of water or alternate slugs of water and gas. A production tubing 84 extends downwardly from well head 88 inside casing 78 to a depth near a formation 76 into which water and/or gas is to be injected. Casing 78 has been perforated by perforations 82 in formation 76 to permit the injection of water and/or gas. It will be understood that the well may be completed with or without casing through the formation of interest, as known to those skilled in the art. In other words, the well in the formation of interest may be open hole and the injection may be made directly into formation 76. A packer 86 is positioned between tubing 84 and casing 78 to prevent the flow of liquids or gas upwardly between tubing 84 and casing 78. To inject water into the well a valve 92 in a water injection line 90 is opened and a valve 96 in a gas injection line 94 is closed. Water is then flowed downwardly through tubing 84 and into formation 76. When produced water, for instance from an oil/gas/water separator, is injected it has been found that schmoo deposits on the inner surfaces of the tubing, the casing below packer 86, the perforations, and portions of the formation.

These deposits can become a problem in wells which are used only for water injection. The deposits can accumulate to a level sufficient to restrict flow and, as discussed previously, can result in the formation of spots of active bacteria which may result in the formation of pits in tubing 84 which may eventually extend through tubing 84. Accordingly, it is necessary to clean such deposits from tubing 84 periodically and it is also necessary to clean such deposits from the inside of casing 78 below tubing 84 and the inside of any open-hole portion of the well extending into or through formation 76. Similarly, such deposits can form in the near wellbore portions of formation 76 and restrict flow into the formation. Such deposits can be removed by a method consisting essentially of injecting the aqueous surfactant composition described above into the tubing in an amount sufficient to substantially fill the tubing and portions of the well in fluid communication with the tubing. The aqueous surfactant composition is then held in place by maintaining pressure on line 90 or by closing valve 92. Generally, formation 76 will have sufficient pressure to prevent the flow of the surfactant composition into formation 76. The aqueous surfactant composition is desirably maintained in the tubing and wellbore for a suitable period of time which typically is at least 1 hour, frequently is from about 1 to about 4 hours and, in many instances, is about 3 hours. Longer times may be used if necessary for thicker deposits and the like. After the time period, the surfactant solution may be flushed into subterranean formation 76 by injecting an aqueous solution such as water, brine or the like, through tubing 84. Alternatively, an amount of water or brine may be injected sufficient to push a portion of the surfactant composition into formation 76 in a zone 100, as shown in FIG. 6 by pushing from about ½ to about ¾ of the aqueous surfactant composition in the well into the formation by the injection of a limited amount of water or brine. This solution may then be held in the formation for a second period of time comparable to the first period of time to remove deposits from the perforations and near wellbore formation. The aqueous surfactant composition may then be flushed into the surrounding formation by resumption of water injection through line 90. Repeated treatments may be used if necessary.

When the well is used for alternate water and gas injection, the well is desirably treated as discussed above immediately prior to the resumption of gas injection. The treatment is basically the same as described above, except that after a short period of water injection to flush the surfactant composition into the surrounding formation, gas injection is commenced.

It has been found that in the absence of such treatment, the schmoo tends to dry during gas injection and crack and fall from the tubing and casing walls into the lower portion of the wellbore and may, in some instances, accumulate to a sufficient depth to plug perforations 82. The deposits can accumulate to a substantial depth and may cover the perforations even when multiple injection zones are used. The practice of the method described above has been found effective to remove such deposits from the tubing and other well surfaces in some instances so that operations can be continued without formation plugging, tubing failure and the like.

When deposits have accumulated in the bottom of the well to a depth which can be contacted with the surfactant composition as discussed above, they may be removed by the same steps described above. It may be necessary in such instances to use longer time periods to permit the surfactant composition to dissolve the deposits in the lower portion of the wellbore since it is more difficult to achieve intimate contact with the deposits when the deposits are present to a substantial depth. In any event, it has been found that the use of the method described above is sufficient to remove deposits which have accumulated to a depth which may be contacted with the surfactant composition in the bottom of a wellbore. It may be necessary in some instances to repeat the treatment, especially if perforations are available above the top of the solids accumulation to receive fluids.

Figure 7:
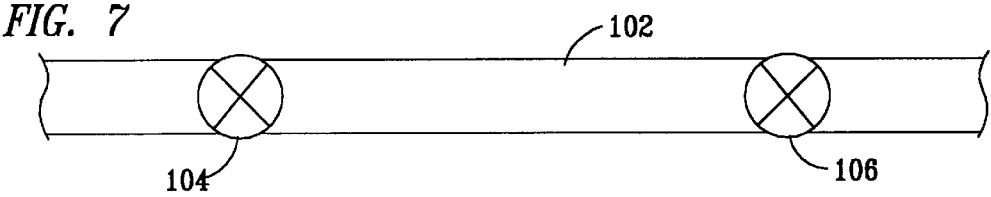
FIG. 7 is a schematic diagram of a flowline.

In FIG. 7, a flowline 102 is shown. Flowline 102 includes a valve 104 and a valve 106. For illustrative purposes, the section of flowline 102 between valves 104 and 106 may be treated by flowing the aqueous surfactant composition into flowline 102 to fill the section of flowline 102 between valve 104 and 106 and thereafter closing valves 104 and 106 for a selected time period, which is desirably from about 1 to about 4 hours. After the time period, the valves are reopened and an aqueous solution is passed through flowline 102 to flush dissolved hydrocarbonaceous material, finely divided inorganic particles and the like from flowline 102. Many flowlines are required for oil field operations and many are not accessible for pigging operations. All such flowlines may readily be treated by the method of the present invention by simply filling the flowlines with the aqueous surfactant composition and permitting the surfactant composition to remain in contact with the flowline surfaces for a selected period of time with the surfactant composition then being flushed from the flowlines with an aqueous solution such as water, brine or sea water.

The configuration of flowlines and other lines used in oil field operations is well known to those skilled in the art and it is considered that all such lines can be treated by the present invention, as discussed above.

In field tests, it has been shown that the use of the method discussed above has resulted in increased injectivities in formations which have been used for water injection for periods of time. It is believed that the cleaning of the deposits of schmoo from the surface formations, perforations and formation passageways has facilitated the injection of fluids into such formations.

Examples

Example 1

Figure 8:
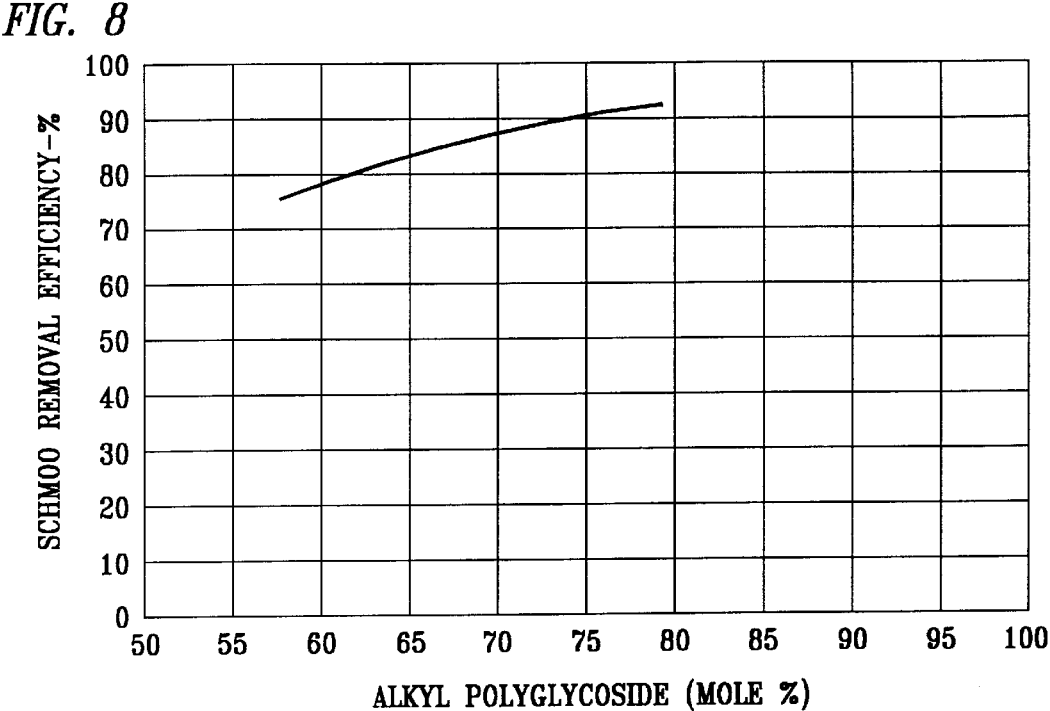
FIG. 8 graphically shows the test results from Example 1.

An evaluation of various dispersant formulations was done using a cleaning test. Metal coupons (10 cm×15 cm strips of carbon steel sheet stock) were first weighed. Schmoo was then applied to the coupons, and then the schmoo-coated coupons were baked at 110° F. in an oven. This process was repeated until the schmoo layer was about 6 mm (0.25") thick. The coupons were then reweighed—the difference being the weight of schmoo applied. Each coupon was then submerged in 30 cc of test dispersant held in a 42-cc vial; the coupons were then allowed to soak undisturbed for the prescribed length of time (typically 3 hours). During this soak time, the temperatures of the vials were maintained at 150° F. in an air bath. After the prescribed time, the vials were placed in a rotator (held in a 60° angle from the horizontal plane) and then rotated at 24 rpm for 15 minutes. Rotation of the vials provided a controlled and reproducible amount of agitation to remove any lightly adhering schmoo residue. The coupons were then removed, dried, and reweighed. The difference between the pre- and post-clean weights was the amount of schmoo removed by the dispersant. The amount of schmoo removed divided by the amount of schmoo applied was the "schmoo removal efficiency" for that combination of formulation, soak time, and temperature. Such cleaning tests were performed for various dispersant formulations, with each test series being repeated three times to test reproducibility. When testing different formulations, typically the total weight % of the alkyl polyglycoside (APG)+ethoxylated alcohol (EA) was held constant, and the relative amounts of the two surfactants were varied (0< APG/(APG +EA)<1). The results were plotted as the schmoo removal efficiency versus mole % of APG for the dispersant and are shown in FIG. 8. Good schmoo removal was achieved in all tests shown. The dispersant contained 1.5 weight percent of APG and EA, 1.5 weight percent of N-Butanol, and 2.75 weight percent of sodium hydroxide.

Example 2

The well selected for the test was a produced water injection and gas injection well that had a history of requiring a fill-cleanout following each switch from produced water (PW) to miscible gas injectant (MI). Since success in field applications was determined by whether wells plugged following the switch from PW to MI, and it was impossible to know whether a well would have plugged without the treatment, the effectiveness of the surfactant was based on the well history. By selecting a well that had a consistent history of plugging at each switch, the test would be more definitive.

The surfactant consisted of an aqueous solution containing 1.5 weight percent mixture of $C_{9-16}$ APG and $C_{9-11}$ ethoxylated alcohol containing 4 ethylene oxide groups per molecule of alcohol, 1.5 weight percent N-Butanol and 2.75 weight percent sodium hydroxide.

The well was shut in at the PW manifold. A surfactant injection line was connected to the well line. The surfactant was pumped into the well line, displacing PW out of the well line, well tubing and lower portions of the well. The surfactant was injected at 150° F. The surfactant was allowed to soak in the well for approximately 3 hours. The well was then put back on PW to flush the surfactant into the reservoir. After about a 4-hour flush, the well was shut in, and subsequently swapped to MI with no plugging.

Immediately prior to treatment, the test well had been taking PW at a rate of about 21,800 BWPD (barrels of water per day). During the flush following the treatment, PW injection rates improved markedly, eventually stabilizing at about 27,300 BWPD for an infectivity increase of 25%. The choke setting and the injection pressure were the same before and after the treatment.

Figure 9:
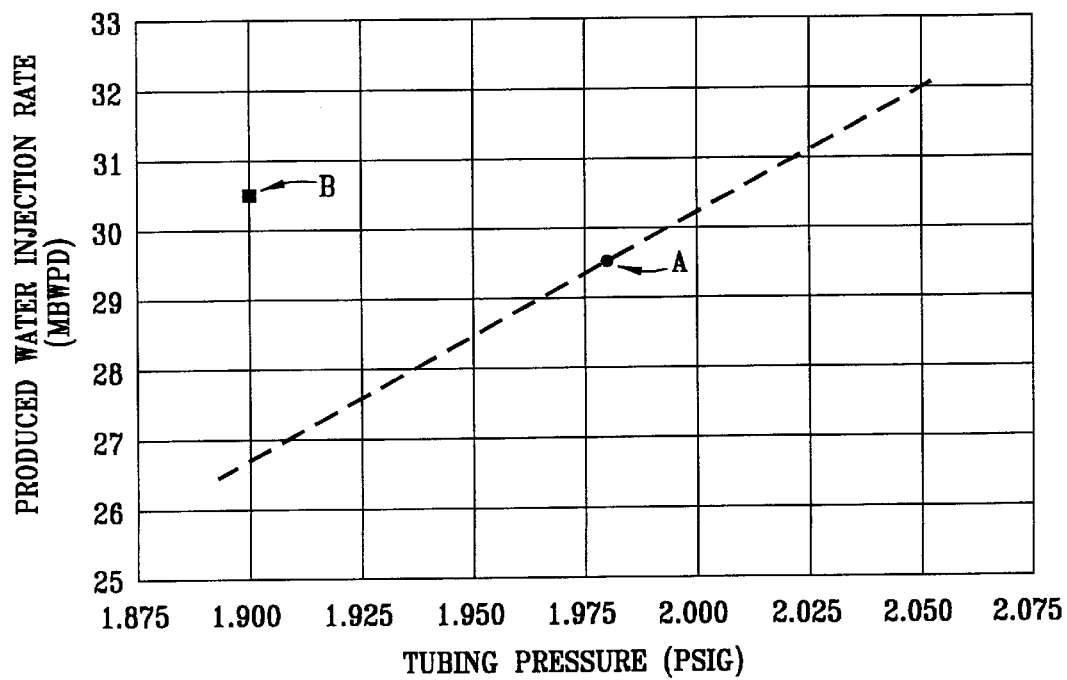
FIG. 9 graphically shows the test results from Example 2.

FIG. 9 shows the injectivity of the test well in thousands of barrels of water per day (MBWPD) during the 21 days prior to the treatment at various pressures. The injection rate at 1975 PSIG immediately prior to the treatment is shown at point A. The higher injectivity of the test well at a lower pressure (1900 PSIG) after the treatment is shown at Point B.

Clearly, the injection of the surfactant composition has increased the injectivity of the formation penetrated by the test well. The cleaning of the formation by the surfactant composition is more effective when the surfactant composition is partially displaced from the well after the first time period and held in the formation for a second time period.

Having thus described the present invention by reference to certain of its preferred embodiments, it is pointed out that many variations and modifications are possible within the scope of the present invention. Many such variations and modifications may be considered obvious and desirable by those skilled in the art based upon the foregoing description of preferred embodiments.

We claim:

1. An aqueous surfactant composition concentrate comprising an aqueous solution containing:
   a) about 4.0 to about 20.0 weight percent of an alkyl polyglycoside surfactant selected from alkyl polyglycosides containing alkyl groups containing from about 8 to about 19 carbon atoms and mixtures thereof and having a DP number from about 1.3 to about 1.8;
   b) about 1.0 to about 15.0 weight percent of an ethoxylated alcohol selected from the group consisting of ethoxylated alkyl alcohols containing from about 6 to about 16 carbon atoms in the alkyl alcohol and from about 2 to about 6 ethylene oxide groups and mixtures thereof and ethoxylated alkyl phenols containing from about 8 to about 14 carbon atoms in the alkyl group and from about 2 to about 8 ethylene oxide groups and mixtures thereof and mixtures of the ethoxylated alkyl alcohols and the ethoxylated alkyl phenols;
   c) about 4.0 to about 30.0 weight percent of a caustic selected from the group consisting of sodium hydroxide, potassium hydroxide, ammonium hydroxide and mixtures thereof; and,
   d) from about 0.5 to about 10.0 weight percent of at least one alkyl alcohol containing from about 4 to about 6 carbon atoms.

2. The concentrate of claim 1 wherein the alkyl polyglycoside surfactant is present in an amount equal to from about 4.0 to about 12.0 weight percent of the aqueous solution.

3. The concentrate of claim 1 wherein the ethoxylated alcohol is present in an amount equal to from about 1.0 to about 8.0 weight percent of the aqueous solution.

4. The concentrate of claim 1 wherein the caustic is present in an amount equal to from about 6.0 to about 22.0 weight percent of the aqueous solution.

5. The concentrate of claim 1 wherein the linear alkyl alcohol is present in an amount equal to from about 1.0 to about 10.0 weight percent of the aqueous solution.

6. The concentrate of claim 1 wherein the alkyl polyglycoside surfactant comprises a first surfactant consisting essentially of alkyl polyglycosides selected from the group consisting of alkyl polyglycosides containing alkyl groups containing from about 9 to about 13 carbon atoms and having an oligomer distribution from 1 to 12 and a second surfactant consisting essentially of alkyl polyglycosides selected from the group consisting of alkyl polyglycosides containing alkyl groups containing from about 12 to about 19 carbon atoms and having an oligomer distribution from 1 to 12.

7. The concentrate of claim 6 wherein the alkyl polyglycoside surfactant contains from about 20 to about 90 mole percent of the first surfactant.

8. A surfactant composition consisting essentially of an aqueous solution containing:
   a) about 0.1 to about 10.0 weight percent of an alkyl polyglycoside surfactant selected from alkyl polyglycosides containing alkyl groups containing from about 8 to about 19 carbon atoms and mixtures thereof;
   b) about 0.1 to about 10.0 weight percent of an ethoxylated alcohol selected from the group consisting of ethoxylated alkyl alcohols containing from about 6 to about 16 carbon atoms in the alkyl alcohol and from about 2 to about 6 ethylene oxide groups and mixtures thereof, and ethoxylated alkyl phenols containing from about 8 to about 14 carbon atoms in the alkyl group and from about 2 to about 8 ethylene oxide groups and mixtures thereof, and mixtures of the ethoxylated alkyl alcohols and the ethoxylated alkyl phenols;

c) about 0.5 to about 10.0 weight percent of a caustic selected from the group consisting of sodium hydroxide, potassium hydroxide, ammonium hydroxide and mixtures thereof; and, d) about 0.1 to about 6.0 weight percent of at least one alkyl alcohol containing from about 4 to about 6 carbon atoms.

9. The composition of claim 8 wherein the alkyl polyglycoside surfactant is present in an amount equal to from about 0.5 to about 6.0 weight percent of the aqueous solution.

10. The composition of claim 8 wherein the alkyl polyglycoside surfactant has a DP number from about 1.30 to about 1.80.

11. The composition of claim 8 wherein the alkyl polyglycoside surfactant comprises a first surfactant consisting essentially of alkyl polyglycosides selected from the group consisting of allyl polyglycosides containing alkyl groups containing from about 9 to about 13 carbon atoms and having an oligomer distribution from 1 to 12 and a second surfactant consisting essentially of alkyl polyglycosides selected from the group consisting of alkyl polyglycosides containing alkyl groups containing from about 12 to about 19 carbon atoms and having an oligomer distribution from 1 to 12.

12. The composition of claim 11 wherein the alkyl polyglycoside surfactant contains from about 20 to about 90 mole percent of the first surfactant.

13. The composition of claim 8 wherein the ethoxylated alcohol is present in an amount equal to from 0.2 to about 4.0 weight percent.

14. The composition of claim 8 wherein the ethoxylated alcohol is selected from the group consisting of ethoxylated alkyl alcohols containing from about 6 to about 16 carbon atoms in the alkyl group and from about 2 to about 6 ethylene oxide groups.

15. The composition of claim 8 wherein the caustic material is present in an amount equal to from about 1.0 to about 5.0 weight percent.

16. The composition of claim 8 wherein the alkyl alcohol is present in an amount equal to from about 0.2 to about 3.0 weight percent.

* * * * *